US007441122B2

(12) United States Patent
Plagne

(10) Patent No.: US 7,441,122 B2
(45) Date of Patent: Oct. 21, 2008

(54) METHOD FOR PROVIDING SECURE ACCESS TO A DIGITAL RESOURCE

(75) Inventor: Sylvain Plagne, Boulogne-Billancourt (FR)

(73) Assignee: Bouygues Telecom (FR)

( * ) Notice: Subject to any disclaimer, the term of this patent is extended or adjusted under 35 U.S.C. 154(b) by 631 days.

(21) Appl. No.: 10/854,589

(22) Filed: May 26, 2004

(65) Prior Publication Data

US 2004/0243855 A1 Dec. 2, 2004

Related U.S. Application Data

(63) Continuation of application No. PCT/FR02/04094, filed on Nov. 28, 2002.

(30) Foreign Application Priority Data

Nov. 28, 2001 (FR) .................................. 01 15386

(51) Int. Cl.
| H04K 1/00 | (2006.01) |
| H04L 9/00 | (2006.01) |
| G05B 19/00 | (2006.01) |
| G05B 23/00 | (2006.01) |
| G06F 7/00 | (2006.01) |
| G06F 7/04 | (2006.01) |
| G06K 19/00 | (2006.01) |
| G08B 29/00 | (2006.01) |
| G08C 19/00 | (2006.01) |
| H04B 1/00 | (2006.01) |
| H04B 3/00 | (2006.01) |
| H04L 9/14 | (2006.01) |
| H04L 9/32 | (2006.01) |

(52) U.S. Cl. ....................... 713/182; 713/184; 340/5.27
(58) Field of Classification Search ................. 713/182, 713/184; 340/5.27

See application file for complete search history.

(56) References Cited

U.S. PATENT DOCUMENTS 5,608,387 A 3/1997 Davies 5,928,364 A 7/1999 Yamamoto (Continued)

FOREIGN PATENT DOCUMENTS

EP 0 677 801 A1 10/1995

OTHER PUBLICATIONS

USENIX Association, "Proceedings of the 9th USENIX Security Symposium", Aug. 14-17, 2000.*

*Primary Examiner*—Ayaz Sheikh
*Assistant Examiner*—Shin-Hon Chen
(74) *Attorney, Agent, or Firm*—DLA Piper LLP (US)

(57) ABSTRACT

A method for providing secure access to a digital resource including a learning step including selecting a secret digital authentication code and registering the code in an electronic memory; and an authentication step including inputting a digital information unit and comparing the information unit input with the digital authentication code recorded in the electronic memory, the authentication step emitting an approval signal when the comparison is positive, wherein the learning step includes displaying at least one table including a multiplicity of motifs arranged according to a matrix correlated with an input device including a predetermined number of command zones and selecting a graphic code by activating at least one command zone associated with a selected motif, and recording the identifier of the selected motif in an electronic memory to form a digital authentication code, and wherein the authentication step includes displaying at least the table of motifs and transmitting to a calculator the identifier(s) of the motifs designated by a user by activating the command zone associated with the motif, the calculator emitting a function conformity signal between the digital authentication code and the digital information unit transmitted to the calculator.

22 Claims, 1 Drawing Sheet

U.S. PATENT DOCUMENTS

| | | |
|---|---|---|
| 5,949,348 A | 9/1999 | Kapp et al. |
| 6,209,104 B1 | 3/2001 | Jalili |
| 6,980,081 B2 * | 12/2005 | Anderson ................... 340/5.53 |
| 2004/0093527 A1 * | 5/2004 | Pering et al. ................ 713/202 |

* cited by examiner

METHOD FOR PROVIDING SECURE ACCESS TO A DIGITAL RESOURCE

RELATED APPLICATION

This is a continuation of International Application No. PCT/FR02/04094, with an international filing date of Nov. 28, 2002 (WO 03/046730, published Jun. 5, 2003), which is based on French Patent Application No. 01/15386, filed Nov. 28, 2001.

FIELD OF THE INVENTION

This invention pertains to the field of computer-related security by the input of a personal information unit that is secret for the referenced user and comparison with the content of a secret memory for the authorization of access to a service or a functionality.

BACKGROUND

The use of passwords to control access to resources such as computers, databases, telecommunication equipment or access control systems is well known. Prior to being given access to a requested resource, the user inputs a valid password normally known only by the user and recorded in a memory of the system thus ensuring the control of the identity between the input password and the recorded password.

The password is usually constituted of a sequence of alphanumeric characters. Such passwords are difficult to remember especially when the password is an arbitrary sequence of alphanumeric characters. The user frequently selects the same password for different equipment (access code for a portable computer, cell phone code, etc.) to resolve this problem. This multiplies the risks that a malicious third party can intercept the password. It also occurs frequently that the password is selected from among sequences that are easy to remember (1234, ABCD, 0000 or a date of birth or other sequence that would be easy to guess) which considerably reduces the security of such authentication methods.

One example of a system is EP 1022922 which describes an authentication method comprising a registration step during which the subscriber selects and records a password in the form of a sequence of characters and authentication steps during which the user inputs a password and transmits it to the server for comparison and validation.

Also known is WO 113243 which discloses a user identification method that enables identification of a user who is a subscriber to a service on a computer network. This method consists notably of requesting that the user submit a unique graphic to the service provider via the intermediary of the information page, the graphic comprising integrated data pertaining to a second password and comparing a first submitted password with the extracted second password to determine whether the predefined relationship exists between the passwords. The user is granted the status of identified subscribing user if the predefined relationship exists and is then provided with access to the service.

The methods based on alphanumeric passwords are also easy to break by using robots generating permutations of alphanumeric characters.

Another drawback of these solutions is based on the fact that the repeated input of the password causes wear of the input keys which makes it easy to detect the password.

An authentication method was proposed in EP 0677801 based on the designation of graphic zones of a predetermined image in a predetermined order. That method comprises means for displaying a predetermined image, means for storing a predetermined number of positions in the predetermined image and means for enabling a user to designate positions in the displayed image.

That solution is not satisfactory either because it uses a pointing device, and involves manipulation of graphic objects requiring adequate memories and noteworthy expenses for transmitting the graphical objects in the case in which they are recorded on a server.

It would therefore be advantageous to resolve these drawbacks by providing a method providing secure access to a resource, especially to a computer-related or telecommunication resource, conciliating a high degree of security and a more convenient use.

SUMMARY OF THE INVENTION

This invention relates to a method for providing secure access to a digital resource including a learning step including selecting a secret digital authentication code and registering the code in an electronic memory, and an authentication step including inputting a digital information unit and comparing the information unit input with the digital authentication code recorded in the electronic memory, the authentication step emitting an approval signal when the comparison is positive, wherein the learning step includes displaying at least one table including a multiplicity of motifs arranged according to a matrix correlated with an input device including a predetermined number of command zones and selecting a graphic code by activating at least one command zone associated with a selected motif, and recording the identifier of the selected motif in an electronic memory to form a digital authentication code, and wherein the authentication step includes displaying at least the table of motifs and transmitting to a calculator the identifier(s) of the motifs designated by a user by activating the command zone associated with the motif, the calculator emitting a function conformity signal between the digital authentication code and the digital information unit transmitted to the calculator.

This invention also relates to a method for providing secure access to a digital resource including selecting a secret digital authentication code and registering the code in an electronic memory by displaying at least one table including a multiplicity of motifs arranged according to a matrix correlated with an input device including a predetermined number of command zones and selecting a graphic code by activating at least one command zone associated with a selected motif, and recording the identifier of the selected motif, and inputting a digital information unit and comparing the information unit input with the digital authentication code recorded in the electronic memory, emitting an approval signal when the comparison is positive by displaying at least the table of motifs and transmitting to a calculator the identifier(s) of the motifs designated by a user by activating the command zone associated with the motif, the calculator emitting a function conformity signal between the digital authentication code and the digital information unit transmitted to the calculator.

BRIEF DESCRIPTION OF THE DRAWING

Better comprehension of the invention will be obtained from the description below of a nonlimitative example of implementation with reference to the attached drawing in which.

DETAILED DESCRIPTION

Figure 1:
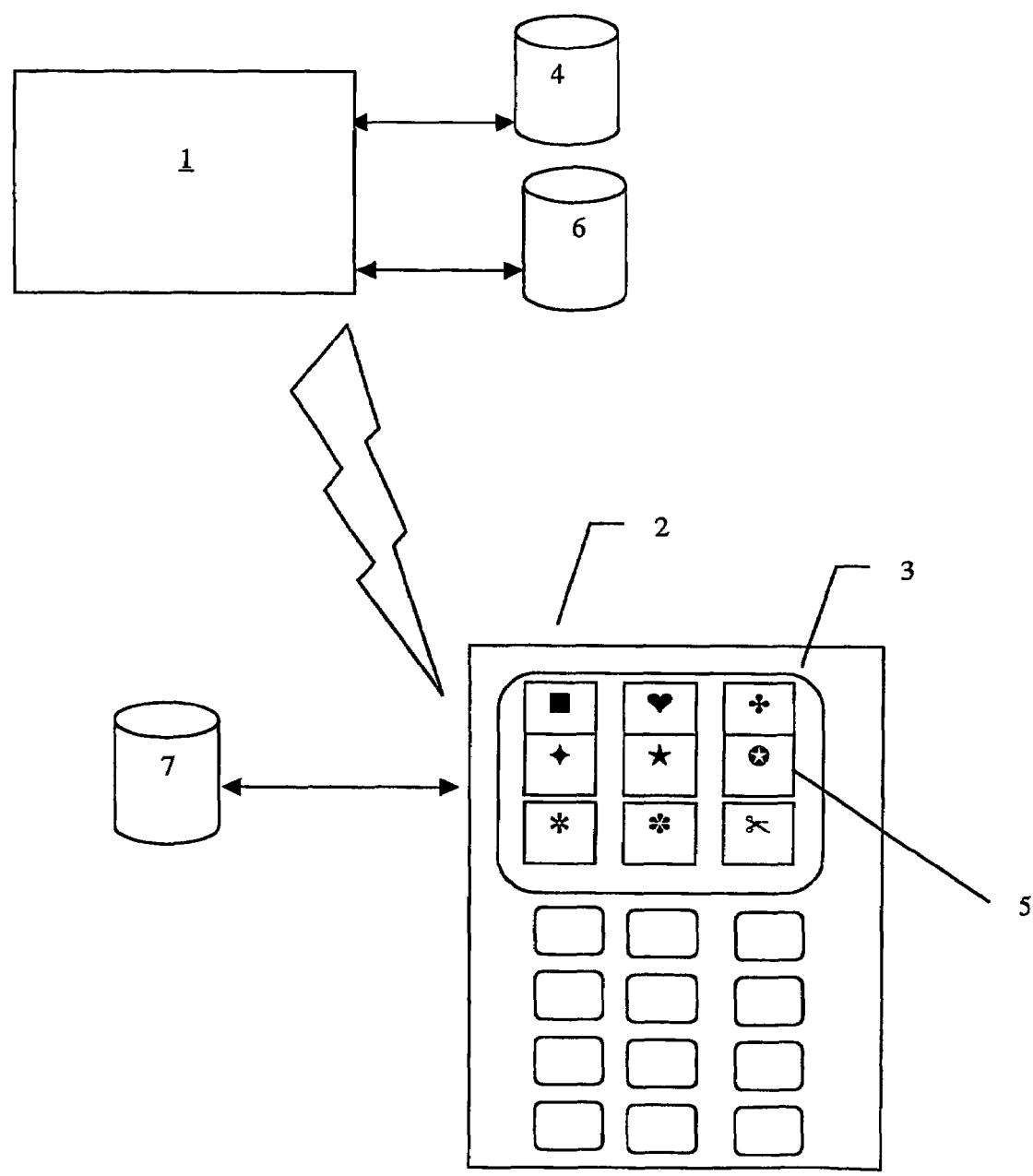
FIG. 1 represents a schematic view of a system for the implementation of the invention.

The invention in its most general sense pertains to a method for providing secure access to a digital resource comprising a learning step that includes selecting a secret digital authentication code and registering it in an electronic memory, and an authentication step including inputting a digital information unit and comparing the information unit input with the digital authentication code recorded in the electronic memory, the authentication step emitting an approval signal when the comparison is positive, wherein the learning step comprises an operation of displaying at least one table comprising a multiplicity of motifs arranged according to a matrix correlated with a designation means (such as a keyboard or a touch-sensitive display, for example) comprising a predetermined number of command zones (such as a key or a zone of a touch-sensitive display, for example) and an operation of selecting a graphic code including activating at least one command zone associated with a selected motif, and recording the identifier of the selected motif in an electronic memory to form a digital authentication code, and wherein the authentication step includes displaying at least the table of motifs and transmitting to a calculator the identifier(s) of the motifs designated by the user by activation of the command zone associated with the motif, the calculator emitting a function conformity signal between the digital authentication code and the digital information unit transmitted to the calculator.

According to an advantageous mode of implementation, the authentication code is constituted of a sequence of motif identifiers, the motifs being organized in the form of a matrix correlated with the distribution of the keys of a keyboard. This mode of implementation enables implementation on equipment such as cell phones, the screens of which have a relatively weak definition.

Each table preferably comprises 3×L motifs associated with 3L identifiers, L being comprised between 1 and 5, and preferably equal to 3 or 4. This mode of implementation is particularly suitable for the designation of the motif by the action on the key of a keyboard designed for keying in a telephone number. This approach provides an alternative to the use of a touch-sensitive display.

According to one embodiment of implementation, the method comprises a personalization step comprising a step of displaying N tables originating from a library of M tables, each table being subdivided into P motifs, each table being associated with an identifier $T_i$ and each motif being associated with an identifier $M_{Ti,j}$, a step of recording at least one identifier $M_{Ti,j}$ selected by activation of a key associated with the corresponding motif, and a step of recording an authentication code comprising the identifiers of the selected tables and motifs, the authentication step comprising a step of displaying at least a part P of said N tables, of recording an information unit corresponding to the key associated with a motif of each table activated by the user, and of comparing the information with the authentication code recorded during the personalization step.

P is preferably smaller than N.

According to a preferred embodiment, the order of display of the P tables is random.

The arrangement of the $M_{Ti,j}$ motifs of a table $T_i$ is preferably random.

According to a preferred mode of implementation, the method comprises a step of recording in the memory of a client equipment unit a library of digital tables.

According to another preferred embodiment, it comprises a step of downloading from a memory of a server comprising a library of M tables of a subset of N digital tables into the memory of a client equipment unit.

According to yet another embodiment, it comprises a step of secure transmission of the identifiers $M_{Ti,j}$ of the motifs designated by the user on a client equipment unit to a server, the recording processing of the authentication code and comparison being performed on the server.

The invention also pertains to a system comprising at least one individual equipment unit and an authentication server for conditional access to a digital server wherein the authentication server comprises a memory for recording a library of digital tables formed by a multiplicity of motifs and a secure memory to record the authentication codes of the authorized users, the individual equipment units comprising a memory to record a library of digital tables, the system comprising exchange means of the identifiers of the motifs for the personalization steps of the authentication code and verification of authorization of a user.

Such a system is intended for the implementation of the above-described method from an authentication server exploited by a multiplicity of client equipment units, e.g., cell phones.

The invention also pertains to an individual equipment unit for conditional access to a digital service, comprising a memory for recording a library of digital tables formed by a multiplicity of motifs and a secure memory for recording the authentication codes of the authorized users, as well as a memory for recording a library of digital tables, the system comprising exchange means of identifiers of the motifs for the personalization step of the authentication code and verification of the authorization of a user.

Such a system is intended for the local implementation of the above-described method from client equipment units, e.g., cell phones, a microcomputer, a personal digital assistant (PDA) or the like.

Turning now to FIG. 1, the description below pertains to the remote mode of use of the method.

According to a particular mode of implementation, the method comprises an introductory learning step and a normal use step. The introductory step enables the user to select a certain number of tables of motifs.

The authentication server (1) transmits to an equipment unit (2), e.g., a cell phone, a first file in the form of digital data (in the data block of the control packet in accordance with the standard GSM 03.48 if the invention exploits the possibilities of the SIM card. In the case in which the SIM card is not used, reference will be made to the appropriate standards such as GSM DATA CSD and GPRS). This file corresponds to the graphical elements enabling display on the screen (3) of a table extracted from a multiplicity of tables originating from a library recorded in a memory (4) of the server. This table is subdivided into 9 graphical elements (5) forming pictograms or symbolic designs (the symbols used on highway signs, chemical symbols, signs of the zodiac or the like).

The user can accept or reject a displayed tabled by activating a control by hitting a key on a telephone, e.g., the validation key normally used for scrolling the menu or a telephone function key.

In the case of rejection, the server transmits a new file corresponding to a new table originating from the library of tables.

In the case of acceptance, it records the identifier of the table in a memory (6) comprising a table associated with each of the referenced users. Moreover, the file is recorded in a local memory (7) to enable during subsequent exchanges between the server (1) and the equipment (2), the transmission solely of the table identifier and not the complete graphical file.

For each of the tables selected, the user specifies which of the motifs to be selected in the future upon request for authentication. For example, if each table is constituted by 9 motifs, the user specifies which of the 9 motifs are stored in memory. This information is transmitted to the server in the form of the identifier of the selected motif and recorded in the above-mentioned table.

The registration procedure comprises, for example, recording of 4 identifiers of motifs originating from 4 different tables. The identification server thus has available for each referenced user the information units necessary to verify an access code and possibly to generate an authorization signal for the activation of an associated service. In the example described, the implemented learning procedure describes the equipment to be made secure.

According to particular modes of implementation, this learning step can be performed on an Internet site, by telephone, by mail (the user indicates the selected tables and responses, and an operator is responsible for inputting the results) or the like. At the end of this learning personalization step, the preferred motifs and tables selected by the user are recorded in a computer-based server referred to as the "authentication server."

Upon subsequent attempts at remote connection, the user will see displayed on the screen of the terminal all or part of the selected tables. For each of these tables, the user must press on the key of the terminal corresponding to the response that were given during the learning phase. If the terminal has a touch-sensitive display, the user can select the motif directly rather than pressing on a key.

At the end of this phase, the responses are sent to the authentication server. If the responses correspond to the responses recorded during the learning phase, the user is authenticated. In the contrary case, authentication will be denied (according to particular modes of implementation, a certain number of attempts can be authorized).

The two steps can be summarized by the following algorithms:

Learning and Personalization Step
1. Select n tables from among m tables
2. For each table 1 selected, request from the user the preferred motif response [i]
3. Record the list of selected tables and responses Authentication Step
1. Authentication server randomly selects p tables from among the n tables selected by the user, this also in a random order
2. For each table request from the user the preferred motif response [i]
3. Compare the responses given with the previously recorded responses
4. Display the authentication result The infrastructure used can be schematized as follows:
Different protocols can be used for authenticating the user, but a particular mode of implementation includes of using the WAP protocol.

The WAP protocol, the standards for which were set by the WAPFORUM, enables the display of images on the screen of a mobile terminal and the submission of requests to the user. The responses to these requests constitute the combination of the keys pressed by the user.

Other protocols can be used as a function of the capacities of the terminal employed: http protocols, SMS messages, EMS or MMS and the like.

During the authentication procedure, the presentation of the tables can be random as can be the order of the motifs in a table. The transmission of a random order of the tables is controlled by the server, by the transmission of table identifiers selected during the personalization phase in any order whatsoever.

The position of the motifs in a table can be random, the selection of a motif triggering the transmission of the corresponding identifier irrespective of its position in the table.

The invention can also be implemented locally. In this case, the tables are recorded solely in a local memory and the comparison between the motifs selected and the motifs recorded during the personalization step is also implemented locally.

The invention claimed is:

1. A method for providing secure access to a digital resource comprising:
a learning step and an authentication step, wherein
the learning step comprises:
displaying at least one table provided from a library of digital tables of a server, said at least one table comprising a multiplicity of motifs, each motif being associated with only one table, the multiplicity of motifs arranged according to a matrix correlated with an input device comprising a predetermined number of command zones,
selecting a graphic code by activating at least one command zone associated with a selected motif,
recording an identifier of the selected motif in an electronic memory to form a secret digital authentication code and registering the code in an electronic memory of the server, and
recording the library of digital tables in the memory of a client equipment unit;
the authentication step comprises:
displaying at least the table of motifs;
inputting a digital information unit by activating by a user the command zone associated with the motif,
transmitting to a calculator the identifier(s) of the motifs designated by a user,
comparing the digital information unit input with the secret digital authentication code recorded in the electronic memory,
emitting by the calculator a function conformity signal between the secret digital authentication code and the digital information unit transmitted to the calculator.

2. The method according to claim 1, wherein the authentication code comprises a sequence of motif identifiers, the motifs organized in the form of a matrix correlated with a distribution of keys of a keyboard.

3. The method according to claim 2, wherein each table comprises 3×L motifs associated with 3L identifiers, L being between 1 and 5.

4. The method according to claim 2, wherein each table comprises 3×L motifs associated with 3L identifiers, L being equal to 3 or 4.

5. The method according to claim 1, further comprising:
a personalization step comprising a step of displaying N tables obtained from a library of M tables, each table being subdivided into P motifs, each table being associated with an identifier $T_i$ and each motif being associated with an identifier $M_{Ti,j}$;

a step of recording at least one identifier $M_{T_i,j}$ selected by activating a key associated with a corresponding motif; and a step of recording an authentication code comprising identifiers of the selected tables and motifs, wherein the authentication step comprises a step of displaying at least a part P of said N tables, recording an information unit corresponding to the key associated with a motif of each table activated by the user, and comparing the information with the authentication code recorded during the personalization step.

6. The method according to claim 5, wherein P is smaller than N.

7. The method according to claim 5, wherein the order of display of part P tables is random.

8. The method according to claim 5, wherein arrangement of the $M_{T_i,j}$ motifs of a table $T_i$ is random.

9. The method according to claim 8, further comprising a step of downloading from a memory of a server comprising a library of M tables of a subset of N digital tables into the memory of a client equipment unit.

10. The method according to claim 9, further comprising a step of secure transmission of the identifiers $M_{T_i,j}$ of the motifs designated by the user on a client equipment unit to a server, the recording processing of the authentication code and comparison being performed on the server.

11. The method according to claim 1, wherein the client equipment unit includes a cell phone, a microcomputer, and a personal digital assistant (PDA).

12. A method for providing secure access to a digital resource comprising:

selecting a secret digital authentication code, which comprises:

displaying at least one table providing from a library of digital tables of a server, said at least one table comprising a multiplicity of motifs, each motif being associated with only one table, the multiplicity of motifs arranged according to a matrix correlated with an input device comprising a predetermined number of command zones, selecting a graphic code by activating at least one command zone associated with a selected motif to form a secret digital authentication code, recording the identifier of the selected motif, registering the code in an electronic memory, and recording the library of digital tables in the memory of a client equipment unit, and the method further comprising a step of inputting a digital information unit and comparing the information unit input with the digital authentication code recorded in the electronic memory, and emitting an approval signal when the comparison is positive by displaying at least the table of motifs and transmitting to a calculator the identifier(s) of the motifs designated by a user by activating the command zone associated with the motif, the calculator emitting a function conformity signal between the digital authentication code and the digital information unit transmitted to the calculator.

13. The method according to claim 12, wherein the authentication code is constituted of a sequence of motif identifiers, the motifs organized in the form of a matrix correlated with a distribution of keys of a keyboard.

14. The method according to claim 13, wherein each table comprises 3×L motifs associated with 3L identifiers, L being between 1 and 5.

15. The method according to claim 13, wherein each table comprises 3×L motifs associated with 3L identifiers, L being equal to 3 or 4.

16. The method according to claim 12, further comprising:

displaying N tables obtained from a library of M tables, each table being subdivided into P motifs, each table being associated with an identifier $T_i$ and each motif being associated with an identifier $M_{T_i,j}$; recording at least one identifier $M_{T_i,j}$ selected by activation of a key associated with the corresponding motif; and recording an authentication code comprising identifiers of the selected tables and motifs, wherein authentication comprises displaying at least a part P of the N tables, recording an information unit corresponding to the key associated with a motif of each table activated by the user, and comparing the information with the authentication code recorded.

17. The method according to claim 16, wherein P is smaller than N.

18. The method according to claim 16, wherein the order of display of the part P tables is random.

19. The method according to claim 16, wherein arrangement of the $M_{T_i,j}$ motifs of a table $T_i$ is random.

20. The method according to claim 19, further comprising downloading from a memory of a server comprising a library of M tables of a subset of N digital tables into the memory of a client equipment unit.

21. The method according to claim 20, further comprising securely transmitting the identifiers $M_{T_i,j}$ of the motifs designated by the user on a client equipment unit to a server, the recording processing of the authentication code and comparison being performed on the server.

22. A method for providing secure access to a digital resource comprising:

a learning step comprising:

displaying a plurality of tables each comprising a set of motifs, wherein each motif is associated with only one table, the motifs arranged according to a matrix correlated with an input device comprising a predetermined number of command zones;

selecting tables from the plurality of tables displayed;

selecting motifs from within the selected tables by activating at least one command zone associated with the motif; and recording the selected tables and selected motifs in an electronic memory, the selected tables and selected motifs forming a digital authentication code; and an authentication step comprising:

displaying at least one of the selected tables;

selecting the selected motifs from within the selected tables by activating at least one command zone associated with the motif;

comparing the selected motifs with the digital authentication code recorded during the learning step; and emitting an approval signal when the comparison is positive.

* * * * *